United States Patent [19]

Suh

[11] 4,386,165
[45] May 31, 1983

[54] STYRENIC POLYMER FOAMS AND PREPARATION THEREOF

[75] Inventor: Kyung W. Suh, Granville, Ohio

[73] Assignee: The Dow Chemical Company, Midland, Mich.

[21] Appl. No.: 306,257

[22] Filed: Sep. 28, 1981

Related U.S. Application Data

[63] Continuation-in-part of Ser. No. 156,901, Jun. 6, 1980, abandoned.

[51] Int. Cl.$^3$ ............................................... C08J 9/14
[52] U.S. Cl. ........................................ 521/79; 521/98; 521/146; 521/907; 524/275; 524/467
[58] Field of Search ................. 521/98, 907, 146, 79

[56] References Cited

U.S. PATENT DOCUMENTS

| | | | |
|---|---|---|---|
| 2,894,918 | 7/1959 | Killoran et al. | 521/907 |
| 3,004,935 | 10/1961 | Raley, Jr. et al. | 521/907 |
| 3,635,850 | 1/1972 | Birkner et al. | 521/907 |
| 3,655,589 | 4/1972 | Wingler et al. | 521/907 |
| 3,668,155 | 6/1972 | Raley, Jr. | 521/95 |
| 4,229,396 | 10/1980 | Suh et al. | 264/53 |
| 4,325,852 | 4/1982 | Hallenbeck | 523/334 |

FOREIGN PATENT DOCUMENTS 53-33268  3/1978  Japan .

OTHER PUBLICATIONS

The Condensed Chemical Dictionary, 9th ed., pp. 924–925.

*Primary Examiner*—Morton Foelak
*Attorney, Agent, or Firm*—J. W. Morse; J. B. Guffey

[57] ABSTRACT

Extruded styrenic polymer foams having improved flammability characteristics are obtained when using volatile fluid blowing agents by incorporating therein a small amount (e.g., from about 0.03 to about 2 weight percent based on polymer) of a waxy material in conjunction with at least one conventional non-waxy halogenated flame retarding agent.

13 Claims, No Drawings

STYRENIC POLYMER FOAMS AND PREPARATION THEREOF

CROSS-REFERENCE TO RELATED APPLICATION

This application is a continuation-in-part of the co-pending application Ser. No. 156,901, filed June 6, 1980 abandoned.

BACKGROUND OF THE INVENTION

This invention relates to styrenic polymer foams having improved flammability characteristics and to a composition and process for the preparation thereof.

Extruded foams of styrenic polymers are known and are highly desirable for many applications such as for use as thermal insulation, packaging and the like. In such applications, it is generally desirable that such styrenic polymer foams exhibit the best practicable flammability characteristics (i.e., the lowest practicable propensity to ignite and/or to support combustion once ignited). Accordingly, a number of prior art approaches for improving the flammability characteristics of styrenic polymer foams have been suggested. Such approaches include the incorporation into such foams of relatively large quantities of halogen-containing compounds as flame retardant components therein; the incorporation of somewhat smaller amounts of halogen-containing compounds in conjunction with organic peroxide compounds; as well as the incorporation, in combination with iron naphthenate, of chlorine compounds (e.g., chlorinated paraffins) in an amount sufficient to provide at least 2 percent by weight of chlorine content based upon the polymer composition. (See, for example, U.S. Pat. No. 3,595,815.) Unfortunately, however, such prior art approaches toward improved flammability characteristics generally carry with them attendant detrimental impact upon other important styrenic polymer foam properties such as decreased ultraviolet stability; decreased polymer stability (and thus increased degradation and decrease in foam strength); increased brittleness; foam discoloration; decreased heat distortion temperature, etc. and/or can introduce troublesome processing problems.

In view of the foregoing, it would be highly desirable to provide a means for improving the flammability characteristics of styrenic polymer foams while at the same time minimizing or at least significantly reducing aforementioned attendant disadvantages of the various prior art approaches.

SUMMARY OF THE INVENTION

In accordance with the present invention, it has now been discovered that the flammability characteristics of styrenic polymer foams containing conventional amounts of known non-waxy halogenated flame retarding agents can be significantly improved by the incorporation therein of a small amount (e.g., from about 0.03 to about 2 weight percent based on polymer) of a waxy material. Accordingly, the present invention is embodied in one aspect in styrenic polymer foams (and styrenic polymer compositions for the preparation thereof) which have incorporated therein (a) from about 0.03 to about 2 weight percent based on polymer of a waxy material and (b) a conventional amount of at least one non-waxy halogenated flame retarding agent.

Also provided by the present invention is an improved extrusion foaming process for styrenic polymer foams having conventional non-waxy halogenated flame retarding agents incorporated therein wherein the improvement comprises incorporating into the polymer foam during the preparation thereof from about 0.03 to about 2 weight percent based upon the polymer of the aforementioned waxy substance and thereby improving the flammability characteristics of the resultant styrenic polymer foam.

Finally, the present invention is also embodied in a method for improving the flammability characteristics of styrenic polymer foams containing conventional non-waxy halogenated flame retarding agents by further incorporating from about 0.03 to about 2 weight percent (based upon such styrenic polymer) of a waxy substance therein.

As used herein, reference to "improving the flammability characteristics", "improved flammability characteristics", "flame retardant" and the like phrases are employed to connote a measurably reduced propensity of a sample of the foam thereby referred to ignite (or a reduced propensity of such sample to sustain combustion if ignited) when exposed to a small scale ignition source such as a Bunsen burner and, of course, such "reduced propensity" is propensity measured relative to that of a foam comparable to that tested except for the absence therefrom of the aforementioned waxy material component of the present invention. Naturally, with regard to the foregoing "flammability" criterion, it must be recognized that all known synthetic hydrocarbon polymers will burn when subjected to a sufficiently intense source of heat. Accordingly, the small scale ignition tests employed herein may not reflect the properties of the polymer foams hereof under actual fire conditions.

DETAILED DESCRIPTION OF THE INVENTION

Styrenic polymers suitable for use in the practice of the present invention include styrene or substituted styrene homopolymers (e.g., polystyrene, polyvinyl toluene, etc.) and copolymers of styrene or substituted styrene with one or more comonomers addition polymerizable therewith (e.g., acrylonitrile, methyl methacrylate, etc.). Preferred styrenic polymers for use herein include polystyrene and copolymers of a major proportion (e.g, 75 weight percent or more) of styrene with a minor proportion (e.g., up to about 25 weight percent) of one or more other monomers addition polymerizable therewith.

Waxy materials suitable for use in the practice of the present invention include both natural and synthetic waxes (including both the halogenated, e.g., chlorinated, and non-halogenated versions thereof) and any such wax that improves the flowability of the styrenic polymer melt under combustion conditions can be suitably employed herein. Thus, for the purposes of the present invention the wax employed can have a melting point above or below the foaming temperature of the styrenic polymer composition employed. However, inasmuch as the use for cell-size enlargement purposes in various polymers of from about 0.01 to 5 weight parts (per 100 weight parts of polymer) of waxes melting below the foaming temperature is already claimed in commonly owned U.S. Application Ser. No. 022,579 (filed Mar. 21, 1979) by K. W. Suh and C. R. Amos now U.S. Pat. No. 4,229,396, the focus of the instant application (and of the claims appended hereto) is therefore directed to those waxy materials which impart improved flammability characteristics, without significantly enlarging the cell size of the resultant styrenic polymer foams and such waxy materials are typically those melting at or above the foaming temperature of the styrenic polymer composition employed. Accordingly, inasmuch as foamable styrenic polymer compositions are generally foamed in the range from about 115° to about 125° C., the waxy materials envisioned for use in the present invention as claimed herein are those having a melting point of at least about 115° C. Preferably such waxy materials have a melting point of from about 115° C. to about 140° C.

As has been noted, the aforementioned waxy materials are employed in the practice of the present invention in an amount of from about 0.03 to less than about 2 weight percent based upon the weight of the styrenic polymer; with the use of larger amounts thereof being generally undesirable due to attendant disadvantageous impact upon the heat distortion temperature of the resultant styrenic polymer foam. Preferably such waxy material is employed in an amount ranging from about 0.05 to about 2.0 weight percent based upon the weight of the styrenic polymer employed. An especially preferred range is from about 0.1 to about 1.5 (with a most preferred range being from about 0.1 to about 1.0) weight percent based upon the weight of styrenic polymer employed.

The non-waxy halogenated flame retarding agents suitably employed in the present invention include those known non-waxy halogenated flame retarding agents conventionally employed in styrenic polymer foams (such as, for example, monochloropentabromocyclohexane, tetrabromobutane, dibromoethylbenzene, dibromopropanol, hexachlorocyclopentadiene, hexabromocyclododecane, and the like) and are employed in the normal amounts (e.g., from about 0.5 to about 10, preferably from about 0.5 to about 5, weight percent based upon the weight of the styrenic polymer employed). Naturally, since the indicated conventional halogenated flame retarding component employed herein is required to be a non-waxy substance, it will be readily recognized that halogenated waxes such as chlorinated paraffins are not the sort of materials to be employed as that particular component of the present invention. Accordingly, it will be similarly apparent that this non-waxy halogenated flame retarding component will always be different than the waxy component employed herein.

The preparation of the styrenic polymer foams of the present invention can be by either extrusion foaming process or by suspension process for making expandable styrenic polymer beads. However, it is a notable advantage of the present invention (i.e., relative to the use of peroxide materials as free radical initiators) that the waxy materials hereof can be suitably employed in extrusion foaming processes whereas most organic free radical initiators decompose under extrusion conditions and can therefore not be suitably employed in that type of process. Accordingly, in a preferred embodiment, the styrenic polymer foams of the present invention are prepared by an extrusion foaming process. In such process, a heat-plastified styrenic polymer gel containing a volatile fluid foaming agent, at least one halogenated flame retarding agent and from about 0.03 to about 2 weight percent (based on polymer weight) of the hereinabove described waxy material is expressed from a die into a region of reduced pressure such that the expressed gel expands into cellular form and is cooled to a temperature at which the expanded cellular gel is self-supporting.

In the practice of the present invention, any known volatile fluid blowing or expanding agents can be employed and the individual ingredients can be combined in any convenient fashion. Thus, for example, the waxy material employed may be mixed with heat-plastified gel or blended with granular resinous styrenic polymer prior to being heat-plastified in the extruder. The waxy material may be added to the polymer before or after the addition of the volatile fluid foaming agent, either before or after the resinous material has been heat-plastified. Alternatively, in a process wherein the volatile fluid foaming agent is being added to a heat-plastified gel within an extruder, the waxy material can be conveniently admixed with the blowing agent and both components added to the extruder simultaneously.

The invention is further illustrated but not limited by the following examples.

EXAMPLE 1

A plurality of waxy materials are evaluated as follows for their effectiveness in improving the flammability characteristics of polystyrene.

A mixture as set forth in Tables I, II, III and IV; consisting of polystyrene, flame retarding agent (monochloropentabromocyclohexane), barium stearate (about 0.075 weight percent based on polymer), magnesium oxide (about 0.015 to 0.03 weight percent based upon polymer) and wax (if any) in the form of a 5 percent polymer concentrate; is fed to an extruder and melted at a temperature of about 200° C. and a pressure of from 1500 to 2000 pounds per square inch. Blowing agent as identified in Tables I, II, III and IV is introduced into the polymer melt in the melting section of the extruder and the resulting mixture is thoroughly mixed and then cooled to the foaming temperature (115° to 125° C.). The mixture is then extruded through a slit die at about 400~600 pounds per square inch and expanded between a pair of substantially parallel plates to form the foam into a rectangular cross-section.

The resulting foam is checked for flammability by holding at horizontal position test pieces ¼ inch thick, 1 inch wide and 6 inches long in the flame of a horizontally positioned micro-burner for 1.5 seconds, removing the burner and noting the time for the sample to extinguish. In such flammability testing, 6 test pieces are cut from each sample and average extinguishment times are reported in Tables I through IV below.

The samples of Table IV were additionally checked for flammability with a slightly different test method which generally corresponded to the test known as the French Flame Persistency Test (CSTB). Three bar-shaped test pieces were cut from each sample board tested. The three specimens measured about 8 to 10 inches in the direction horizontal to extrusion, 35 mm in the extruded direction and 30 mm in the direction vertical to extrusion. The flame of a propane/butane bunsen burner, leaning diagonally at a 45° angle toward the end of the horizontally positioned specimen, was held in contact with the end of the specimen for 5 seconds following the retreating end as it melted and burned away. After 5 seconds the flame was removed and the time required for the burning specimen to extinguish was then recorded. This procedure, termed an "attack" was repeated until the specimen was consumed, usually about 6 to 8 attacks. The average extinguishment time for all the attacks on all of the three specimens is shown for each sample in Table IV, labeled CSTB Time. The results of this CSTB testing are summarized in Table IV below.

TABLE I

| INGREDIENTS and PARAMETERS | WAXY MATERIAL | | | | | |
|---|---|---|---|---|---|---|
| | None (CONTROL) | CANDELILLA WAX | CANDELILLA WAX | CANDELILLA WAX | CERAMER 67 WAX | CERAMER 67 WAX |
| Wax Amount (pph)[1] | 0 | 0.1 | 0.2 | 0.3 | 0.075 | 0.15 |
| Blowing Agent Amount (pph)[1,4] | 17.25 | 16.25 | 16.0 | 16.25 | 16.25 | 16.25 |
| Flame Retarding Agent Amount (pph)[1,3] | 3.0 | 3.0 | 3.0 | 3.0 | 3.0 | 3.0 |
| Foam Density (pcf)[2] | 2.02 | 1.92 | 1.95 | 1.90 | 1.82 | 1.80 |
| Cell Size (mm) | 0.27 | 0.85 | 0.91 | 0.81 | 0.99 | 1.20 |
| Heat Distortion Temp (°F.) | 180 | 180 | 180 | 180 | 180 | 180 |
| Compressive Strength (psi) | | | | | | |
| Vertical | 43.3 | 35.9 | 36.3 | 33.7 | 29.5 | 27.7 |
| Horizontal | 27.2 | 26.0 | 24.8 | 25.6 | 21.0 | 19.9 |
| Extrusion | 30.6 | 20.8 | 20.7 | 21.7 | 13.8 | 13.5 |
| Solution Viscosity (cp) | 10.4 | 10.4 | 9.4 | 9.3 | — | — |
| Extinguishment Time (sec.) | 4.8 | 0.9 | 0.8 | 0.7 | 0.8 | 1.1 |

[1] pph = Parts by weight per 100 weight parts of polystyrene.
[2] pcf = Pounds per cubic foot.
[3] Flame retarding agent = monochloropentabromocyclohexane.
[4] Blowing agent = 22:78 weight ratio mixture of chlorofluoromethane and dichlorodifluoromethane.

TABLE II

| INGREDIENTS and PARAMETERS | WAXY MATERIAL | | | | |
|---|---|---|---|---|---|
| | None (CONTROL) | PETROLITE C-400 WAX | PETROLITE C-400 WAX | None (CONTROL) | CANDELILLA WAX |
| Wax Amount (pph)[1] | 0 | 0.05 | 0.10 | 0 | 0.1 |
| Blowing Agent Type | 50 Methyl chloride/ 50 FC-12* | 50 Methyl chloride/ 50 FC-12* | 50 Methyl chloride/ 50 FC-12* | 30 Ethyl chloride/ 70 FC-31** | 30 Ethyl chloride/ 70 FC-31** |
| Blowing Agent Amount (pph)[1] | 10.0 | 10.0 | 10.0 | 13.0 | 13.5 |
| Flame Retarding Agent Amount (pph)[1,3] | 3.0 | 3.0 | 3.0 | 3.0 | 3.0 |
| Foam Density (pcf)[2] | 1.99 | 1.96 | 1.90 | 1.83 | 1.69 |
| Cell Size (mm) | 0.49 | 0.45 | 0.79 | 1.07 | 1.54 |
| Heat Distortion Temp (°F.) | 180 | 180 | 180 | 135 | 150 |
| Compressive Strength (psi) | | | | | |
| Vertical | 49.9 | 54.9 | 35.7 | — | — |
| Horizontal | 20.2 | 17.9 | 21.0 | — | — |
| Extrusion | 19.2 | 19.1 | 16.2 | — | — |
| Solution Viscosity (cp) | 11.2 | 11.2 | 10.6 | — | — |
| Extinguishment Time (sec.) | 8.0 | 6.8 | 3.8 | 25.8 | 8.1 |

*FC-12 = dichlorodifluoromethane.
**FC-31 = monochloromonofluoromethane.
[1-3] Same as in Table I

TABLE III

| INGREDIENTS and PARAMETERS[3,4] | WAXY MATERIAL | | | |
|---|---|---|---|---|
| | None (CONTROL) | POLY-WAX 2000 | CHLO-ROWAX 70S | NOPCO-WAX |
| Wax Amount (pph)[1] | 0 | 0.2 | 0.2 | 0.1 | 0.2 |
| Foam Density (pcf)[2] | 2.14 | 1.95 | 2.35 | 2.26 | 2.21 |
| Cell Size (mm) | 0.48 | 0.4 | 0.26 | 0.18 | 0.18 |
| Compressive Strength (psi) | | | | | |
| Vertical | 23.6 | — | 53.9 | — | — |
| Horizontal | 33.1 | — | 27.2 | — | — |
| Extrusion | 33.3 | — | 41.0 | — | — |
| Melt Flow Rate (g/10 min) | | | | | |
| at 175° C. | 1.8 | — | 2.0 | — | 2.0 |
| 200° C. | 4.7 | — | 15.1 | — | 18.5 |
| 225° C. | 58.3 | — | 104.6 | — | 82.7 |
| Extinguishment Time (sec.) | 4.4 | 3.0 | 3.3 | 3.3 | 2.4 |

[1] Same as in Table I.
[2] Same as in Table I.
[3] Blowing agent is 50:50 weight ratio mixture of methyl chloride and dichlorodifluoromethane and is employed in an amount of from 11 to 12.5 pph.
[4] Flame retarding agent is monochloropentabromocyclohexane and is employed at 1.45 pph.

TABLE IV

| INGREDIENTS AND PARAMETERS[2,3,7] | WAXY MATERIAL | | | | |
| --- | --- | --- | --- | --- | --- |
| | None (CONTROL) | CHLOROWAX 70S | | | |
| WAX AMOUNT (PPH)[1] | 0 | 0.5 | 1 | 2 | 2 |
| FLAME RETARDING AGENT AMOUNT[4] | | | | | |
| (% BROMINE)[5] | 1.17 | 1.15 | 1.13 | 1.12 | 1.10 |
| (PPH*)[6] | 1.67 | 1.64 | 1.61 | 1.60 | 1.57 |
| EXTINGUISHMENT TIME (SEC.) | 7.8 | 4.2 | 2.6 | 2.8 | 3.0 |
| CSTB TIME (SEC.) | 2.1 | 2.0 | 1.1 | 1.3 | 1.2 |

[1]PPH = Parts by weight per 100 weight parts of polystyrene.
[2]Foam density is approximately 2 pounds per cubic foot.
[3]Blowing agent is 50:50 weight ratio mixture of methyl chloride and dichlorodifluoromethane and is employed in an amount of from about 11 to about 12 parts by weight per 100 weight parts polystyrene.
[4]Flame retarding agent is monochloropentabromocyclohexane.
[5]% Bromine is measured by X-ray fluorescence.
[6]PPH* = parts halogenated flame retarding agent per 100 weight parts total polymer composition.
[7]Cell size is from about .3 to about .4 mm.

What is claimed is:

1. An expandable styrenic polymer composition comprising a styrenic polymer, at least one volatile organic blowing agent, at least one non-waxy halogenated flame retarding agent and from about 0.03 to less than 2 weight percent of a waxy material melting above the foaming point of the styrenic polymer composition but below about 140° C.

2. The expandable styrenic polymer composition of claim 1 wherein the styrenic polymer is polystyrene.

3. The expandable styrenic polymer composition of claim 1 wherein the waxy material is chlorinated paraffin.

4. The expandable styrenic polymer composition of claim 1 wherein the halogenated flame retarding agent is monochloropentabromocyclohexane.

5. The expandable styrenic polymer composition of claim 1 wherein the waxy material is present in an amount of from 0.1 to about 1.5 weight percent based upon the styrenic polymer.

6. The expandable styrenic polymer composition of claim 1 wherein the waxy material is present in an amount of from 0.1 to about 1.0 weight percent based upon the styrenic polymer.

7. In a process for preparing an extruded styrenic polymer foam wherein a heat-plastified styrenic polymer gel containing at least one volatile fluid foaming agent and at least one non-waxy halogenated flame retarding agent is expressed from a die into a region of reduced pressure and wherein the expressed gel expands into cellular form and is cooled to a temperature at which the expanded cellular gel is self supporting; the improvement which comprises incorporating into the heat-plastified unfoamed gal from about 0.03 to less than 2 weight percent, based upon the styrenic polymer weight, of a waxy material which has a melting point below about 140° C. and which imparts improved flammability characteristics to the resulting styrenic polymer foam without significantly increasing the cell size thereof.

8. The process improvement of claim 7 in which the waxy material has a melting point which is equal to or greater than the foaming temperature employed for the heat-plastified polymer gel.

9. The process improvement of claim 8 wherein the waxy material is chlorinated paraffin.

10. The process improvement of claim 8 wherein the waxy material is employed in an amount of from about 0.1 to about 1.5 weight percent based upon the styrenic polymer weight.

11. The process improvement of claim 8 wherein the waxy material is employed in an amount of from about 0.1 to about 1.0 weight percent based upon the styrenic polymer weight.

12. The process improvement of claim 8 wherein the halogenated flame retarding agent is monochloropentabromocyclohexane.

13. The process improvement of claim 8 wherein the styrenic polymer is polystyrene.

* * * * *